(12) United States Patent
Fu et al.

(10) Patent No.: US 8,370,346 B2
(45) Date of Patent: Feb. 5, 2013

(54) MICRO-BROWSER VIEWERS AND SEARCHING

(75) Inventors: Tsui-Ying Fu, Taipei (TW); Ming Chieh Chang, Taipei (TW); Shu-Fong Huang, Taipei (TW); Ellen Huang, Taipei (TW)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 12/331,455

(22) Filed: Dec. 10, 2008

(65) Prior Publication Data

US 2010/0145967 A1 Jun. 10, 2010

(51) Int. Cl.
G06F 7/00 (2006.01)
G06F 17/30 (2006.01)

(52) U.S. Cl. .......................................... 707/729

(58) Field of Classification Search ............. 707/999.01, 707/999.003, 709, 722, 729; 715/252, 864; 345/660
See application file for complete search history.

(56) References Cited

U.S. PATENT DOCUMENTS

| | | | |
|---|---|---|---|
| 5,737,599 A | 4/1998 | Rowe et al. | |
| 5,960,448 A | 9/1999 | Reichek et al. | |
| 6,487,567 B1* | 11/2002 | Michelman et al. | 715/210 |
| 7,277,890 B2 | 10/2007 | Sylthe et al. | |
| 7,379,928 B2 | 5/2008 | Cukierman et al. | |
| 8,302,029 B2* | 10/2012 | Makela | 715/800 |
| 2002/0011990 A1* | 1/2002 | Anwar | 345/173 |
| 2002/0051020 A1* | 5/2002 | Ferrari et al. | 345/854 |
| 2002/0099552 A1* | 7/2002 | Rubin et al. | 704/270 |
| 2003/0122874 A1* | 7/2003 | Dieberger et al. | 345/764 |
| 2003/0135495 A1* | 7/2003 | Vagnozzi | 707/3 |
| 2003/0226104 A1* | 12/2003 | Blazejewski et al. | 715/501.1 |
| 2004/0030741 A1* | 2/2004 | Wolton et al. | 709/202 |
| 2004/0043758 A1* | 3/2004 | Sorvari et al. | 455/414.1 |
| 2004/0260680 A1* | 12/2004 | Best et al. | 707/3 |
| 2006/0069670 A1 | 3/2006 | Khaliq et al. | |
| 2006/0075327 A1 | 4/2006 | Sriver | |
| 2006/0167857 A1 | 7/2006 | Kraft et al. | |
| 2007/0074108 A1* | 3/2007 | Xie et al. | 715/517 |
| 2007/0124295 A1 | 5/2007 | Forman et al. | |
| 2007/0143669 A1* | 6/2007 | Royer | 715/523 |
| 2007/0162566 A1* | 7/2007 | Desai et al. | 709/219 |
| 2007/0294646 A1* | 12/2007 | Timmons | 715/864 |
| 2008/0059445 A1* | 3/2008 | De Bellis | 707/4 |
| 2008/0306913 A1* | 12/2008 | Newman et al. | 707/3 |
| 2009/0193337 A1* | 7/2009 | Carter et al. | 715/277 |

OTHER PUBLICATIONS

Frayling, et al., "SmartView: Enhanced Document Viewer for Mobile Devices" Retrieved at <<http://wbpaley.com/projects/classes/COMS_E6174_Spring05/assignments/hw8/dj2115/tr-2002-114.pdf>>, Nov. 15, 2002, Technical Report MSR-TR-2002-114, pp. 11.
"Search Inside the Book", Retrieved at <<http://www.amazon.com/Search-Inside-Book-Books/b? ie=UTF8&node=10197021>>, Sep. 26, 2008, pp. 3.

* cited by examiner

Primary Examiner — Robert Beausoliel, Jr.
Assistant Examiner — Nicholas Allen (57) ABSTRACT

Architecture that enables a user to connect, search, and review information under a mobile context by interacting through a micro-browser. The current "Find" experience can now be made part of the document search functionality thereby allowing the user to enter one or more keywords to quickly search and obtain the information desired. The "Find" feature can be part of the micro-browser viewer and solves the current inability of the user to view and read documents on the small display of the mobile device. Additionally, users can choose to search from the current page or from the beginning of the document. Results are listed with the keyword(s) emphasized (e.g., highlighted) in a portion of the content in which the keyword(s) was found. The page number can also be presented. Each result can be presented is an active link that automatically navigates the user directly to the associated keyword of the page.

20 Claims, 12 Drawing Sheets

MICRO-BROWSER VIEWERS AND SEARCHING

BACKGROUND

Mobile connections are continuing to grow rapidly in the global market due to the flexibility provided by converging technology into such small portable devices. Revenue growth in the mobile marketplace is increasingly driven by the type and number of data services, though voice appears to remain the largest revenue driver. However, mobile devices are quickly evolving such that voice communications is not the sole use of such devices. For example, people can use mobile devices (e.g., smart phones, etc.) for more diverse purposes on a daily basis such as accessing the Internet, managing personal information, and obtaining the desired information from available network sources.

Consider an example where a salesperson is dealing with a customer about a product. When away from the office or direct connection to the corporate network, the salesperson receives an inquiry from the customer for more detailed specification information about the product. However, without a laptop or other typical data access device, the salesperson cannot expediently access the company network to retrieve this information from corporate data sources. There remains a technological gap in the ability to search and readily obtain the desired information via such mobile devices.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables a user to connect, search, and review information under a mobile context by interacting through a micro-browser of the mobile device. The architecture facilitates the use of a feature phone, for example, to access the desired information (e.g., product specification) stored at a company collaboration website, for example. In operation, the user can now connect to the company website and find the specification document using the client application(s) of the mobile client device.

In one implementation, the ordinary "Find" functionality in the personal computing experience or other client application in mobile devices is discarded, and a new way is provided that allows users to find the information desired more efficiently. In other words, the current "Find" experience can now be made part of the document search functionality. More specifically, the disclosed functionality, which can be made part of an enhanced "Find" feature, allows the user to enter one or more keywords to quickly search and obtain the information desired. The "Find" feature can be part of the micro-browser viewer and solves the current inability of the user to view and read documents on the small display of the mobile device.

In addition to inputting keyword(s), an option is added that allows users to choose to search from the current page or from the beginning of the document. After the search is performed, all results are listed with the keyword(s) emphasized (e.g., highlighted) in a portion of the content (e.g., text) in which the keyword(s) was found. The page number of the document in which the result (keyword) was found can also be presented. Each result can further be presented is an active link (e.g., hyperlink) that when selected automatically navigates the user directly to the associated keyword of the page.

In one specific embodiment, the Find action stops searching when ten keywords results are returned or when no result is returned within ten pages of the document. The condition of limiting the return of ten keywords addresses the problem of the potentially entering the wrong keyword, and there are already too many keywords in the first page. Users can then input different keywords without the inordinate wait that could result for a worthless search. The condition of no results found within ten pages addresses when searching within a large document of many pages. If the keyword is in the last page of a 100-page document, some indication is provided to the user that the system has not failed, locked, the search is not defective, etc., by providing an early indication that the system is still viable, but that the search is being performed on a large document. In this case, users can be prompted that no results have been found within ten pages (a configurable parameter) and then provide the users with an option to continue searching, refine the search, or to exit the search, for example.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture enables a user to connect, search, and review information under a mobile context by interacting through a micro-browser. A micro-browser is a web browser designed for small display screens on smart phones and other handheld devices (e.g., wireless). The current "Find" experience can now be made part of the document search functionality thereby allowing the user to enter one or more keywords to quickly search and obtain the information desired. The "Find" feature can be part of the micro-browser viewer and solves the current inability of the user to view and read documents on the small display of the mobile device. Additionally, users can choose to search from the current page or from the beginning of the document. Results are listed with the keyword(s) emphasized (e.g., highlighted) in a portion of the content in which the keyword(s) was found. The page number can also be presented. Each result can be presented as an active link that automatically navigates the user directly to the associated keyword of the page.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
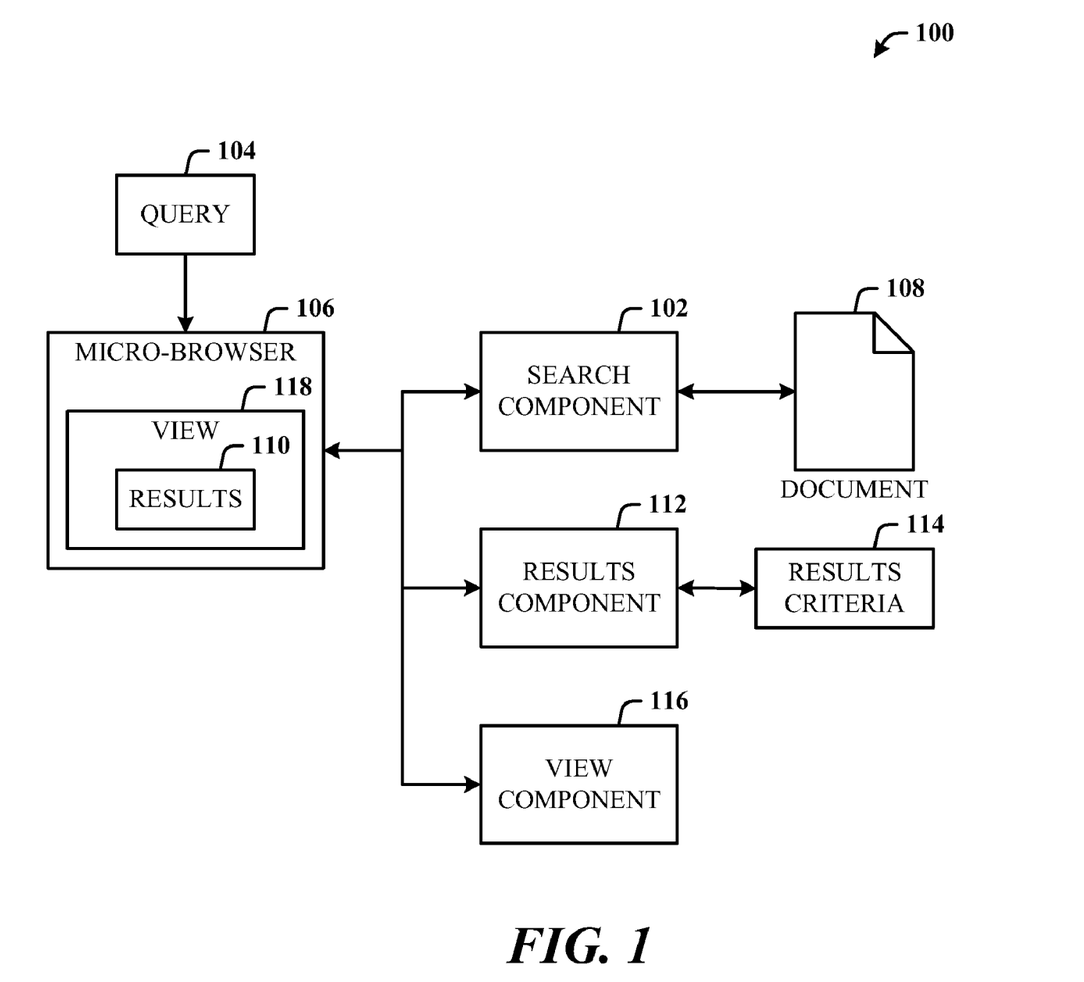
FIG. 1 illustrates a computer-implemented search system in accordance with the disclosed architecture.

FIG. 1 illustrates a computer-implemented search system 100 in accordance with the disclosed architecture. The system 100 includes a search component 102 for receiving a query 104 via a micro-browser 106 and initiating a search in a document 108 for results 110 based on a keyword of the query 104. The system 100 can also include a results component 112 for controlling the search in the document 108 based on results criteria 114. A view component 116 of the system 100 presents results information in a view 118 via the micro-browser 106.

As is described herein below, the results criteria 114 can include a limit on a number of keywords returned and that can be presented as a list in the view 118. The results criteria 114 can also include a limit on a number of pages of the document 108 searched before the keyword is found. The search can be performed over pages of the document 108 and resumed from the page on which the search was paused. The search can also be performed over pages of the document 108 and restarted to the beginning of the document 108 from a page on which the search was paused.

The view component 116 creates and presents the results information in the view 118 as including the results 110 with emphasis (e.g., highlighting, underlining, bolding, etc.) applied to the keyword and the location of the keyword in the document 108. The view component 116 can create and present the results information in the view 118 as including the results 110 in a list and each result includes an active link that when selected navigates to a location of a page in which the result resides.

The search component 102 performs the search in at least one of a word processing document created by a word processing application, a spreadsheet document created by a spreadsheet application, or a presentation document created by a presentation application, for example.

The results information provides interactive control (e.g., a hyperlink) that allows continuation of a paused search, exit of the search, restart of the paused search to a previous page of the document 108, and/or status of the search over a number of pages of the document 108.

Put another way, the search system 100 can include the search component 102 for receiving the query 104 via the micro-browser 106 of a handheld device and initiating a search in the document 108 for results based on a keyword of the query 104. The results component 112 controls the search based on the results criteria 114. The results criteria 114 can include a limit on a number of keywords returned and that can be presented as a list in the view 118, and a limit on a number of pages of the document 108 searched before the keyword is found. The view component 116 presents the results information in the view 118 of the micro-browser 106.

The search is performed over pages of the document 108 and the search can be resumed from a page on which the search was paused, or over pages of the document 108 and the search is restarted to a beginning of the document 108 from a page on which the search was paused. The view component 116 presents the results as a list in the view 118 with highlighting applied to the keyword and a location of the keyword in a document 108, and/or the results as a list in the view 118 and each result includes an active link that when selected navigates to a location of a page in which the result resides. The results information can include the list of results, in which the keyword in each result is emphasized in a partial textual context in which the keyword resides in the document 108.

Figure 2:
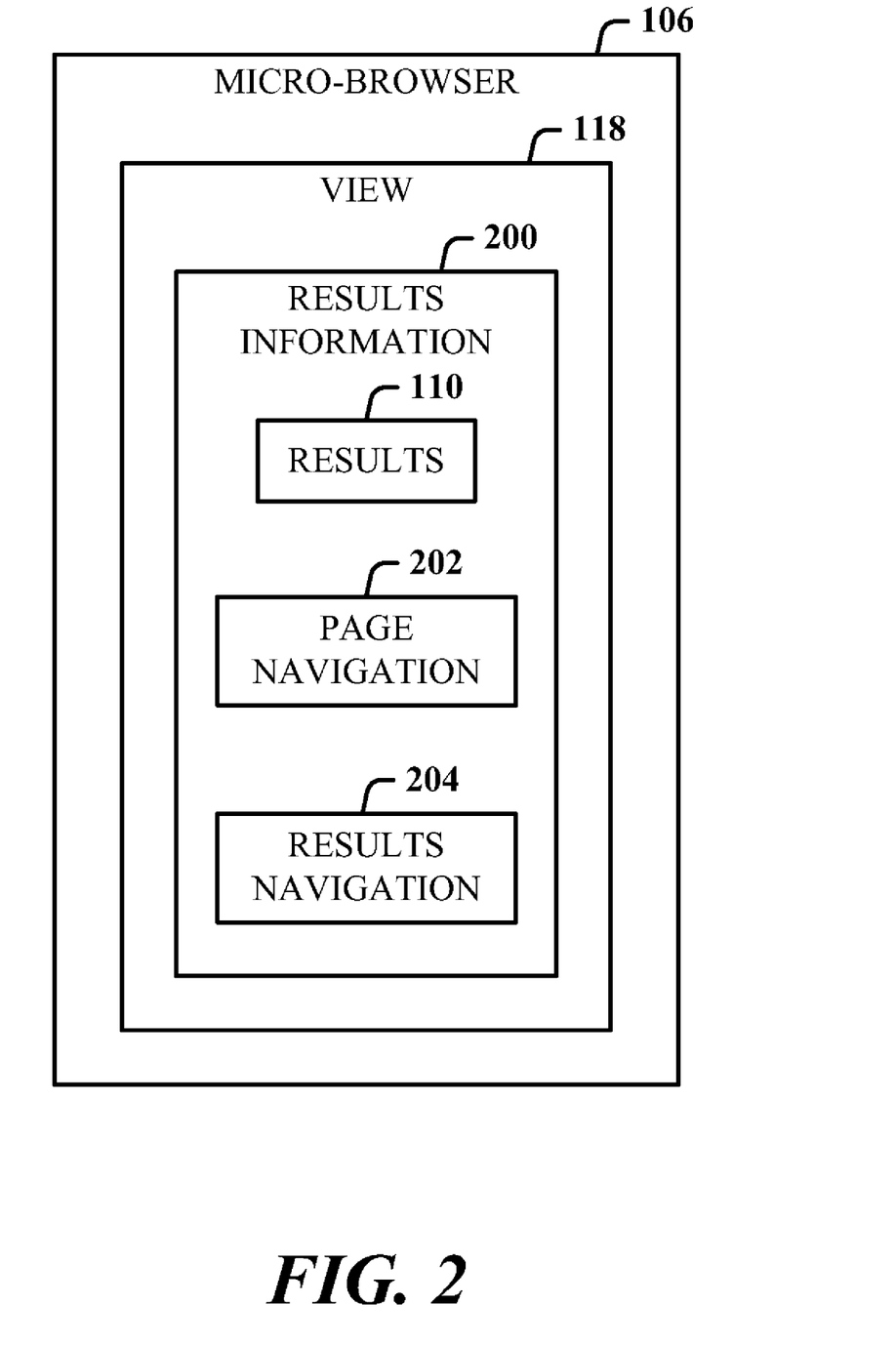
FIG. 2 illustrates results information that can be presented in the view of the micro-browser.

FIG. 2 illustrates results information 200 that can be presented in the view 118 of the micro-browser 106. The results information 200 can include any combination of the results 110 in a list format, controls for page navigation 202, and controls for results navigation 204. The controls for page navigation 202 can include interactive navigations such as selecting a page to search, selecting a range of pages to search, navigating back to a previous page, navigating forward to a page, navigating back to the document, setting the starting page from which to start the search, navigating to previous search results, setting the ending page beyond which the search pauses or terminates, and so on. The controls for results navigation 204 can include formatting each result in the list as a hyperlink that when selected automatically navigates the user to the page and location on the page in which the results resides.

The search function employed herein can be applied as an enhanced Find feature for the device. It is to be understood that when the term "search" is used, it is also intended to include the Find functionality. In one specific implementation, each Find action stops when either of the following conditions is met: a predetermined number of keywords (e.g., ten) are found or no result is found within a predetermined number (e.g., ten) of pages of the document. For an improved user experience, the condition of a limited number of keywords found addresses at least the instance where a user inputs the wrong keyword, and there are already too many keywords in the first page (or page from which the Find was initiated) of the document. Users can then input a different keyword, rather than wait a long time for the Find operation to stop.

The condition of no result found within a limited number of pages applies to searches conducted over pages of a large document. For example, without this condition, if the keyword is in the last page of a 100-page document, the user will be waiting for a lengthy period of time and could decide the search is defective. Accordingly, when there is no result found within these a number of pages, the user can be notified and prompted with an option to continue searching or to exit, for example.

Figure 3:
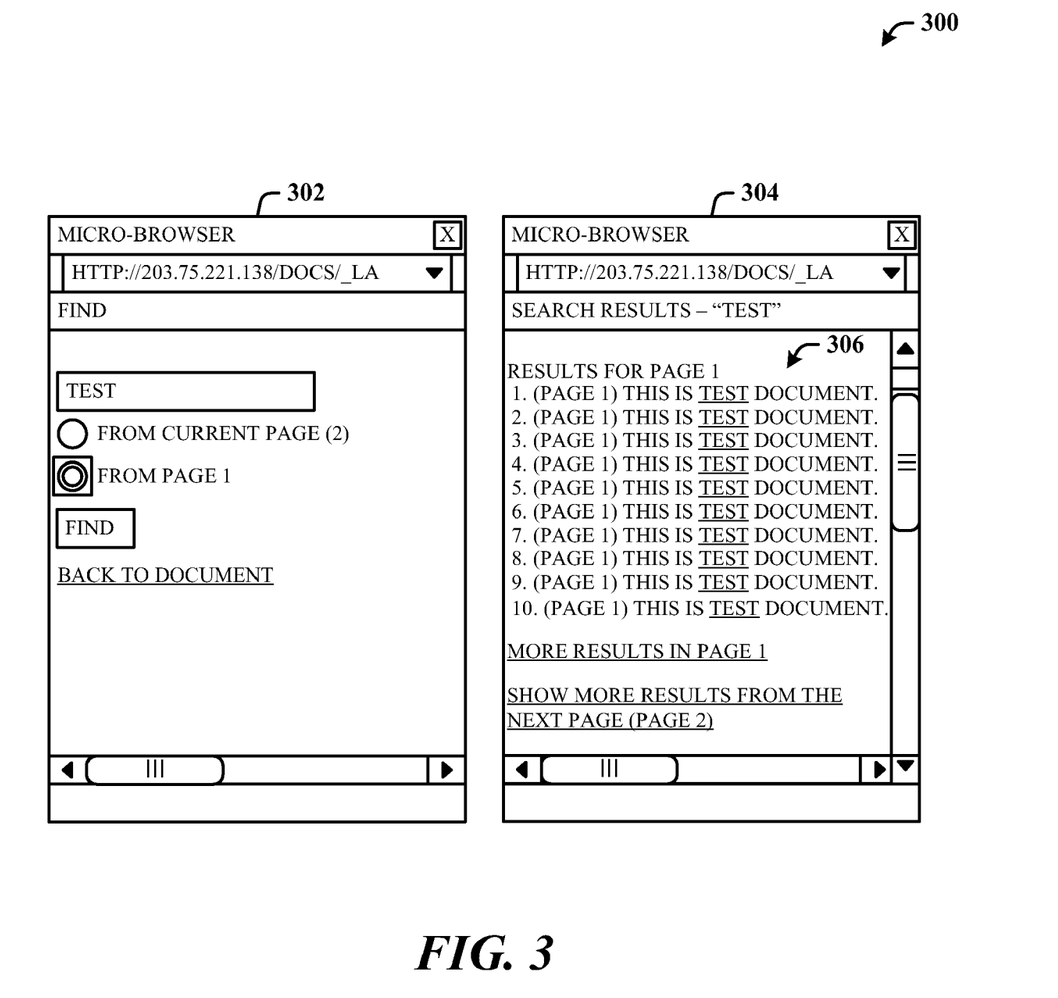
FIG. 3 illustrates an exemplary view that can be presented in the micro-browser to initiate the search and the returned.

FIG. 3 illustrates an exemplary view 300 that can be presented in the micro-browser to initiate the search and the returned. The disclosed enhanced "Find" provides a new way of allowing users to find information more efficiently. The view 300 includes a search (Find) initiation view 302 and a results view 304. In addition to inputting keywords (e.g., TEST), the initiation view 302 can include an option that allows the user to choose to search from the current page (e.g., Page 2) or from the beginning of the document (From Page 1), and also a link back to the document in which the search is being performed.

After the search is performed, the results can be presented in the results view 304 as a listing 306 of some or all the results ordered according to the page number on which the keywords are found; however, this is not a requirement, in that the results can be ranked according to the pages with the most hits, for example. The keyword(s) can be emphasized (e.g., highlighted, italicized, bolded, in quotes, etc.) in some way, in each result listed, and in the textual context (surrounding words) in which the keyword resides. As depicted, the results view 304 presents the results in the listing 306 as itemizations by page, showing the page number of the page that contains the keyword, and a brief textual context (e.g., the full sentence, partial sentence, paragraph, etc.). Moreover, each result can be made a hyperlink (e.g., the keyword for a result item) that allows the user navigate directly to the keyword of the given page. The results view 304 can also include a selection (e.g., hyperlink) that shows more results on the current page, jumps to the results for the next page, or other pages, for example.

The disclosed search feature addresses the inability or lack of motivation by the user to read the document in great detail on the small display. In the ordinary "Find" experience in a personal computer, the user inputs the search keyword and then steps through the results in the document pages to find information within the document. This experience works well on large computer screens, given that the user has sufficient content displayed around the keyword when jumping around inside the document. However, on small devices (e.g., handheld mobile devices) with limited screen size and information provided, the user can easily get lost in the document. Thus, replication of the large PC display search experience to mobile phone search does not work.

Figure 4:
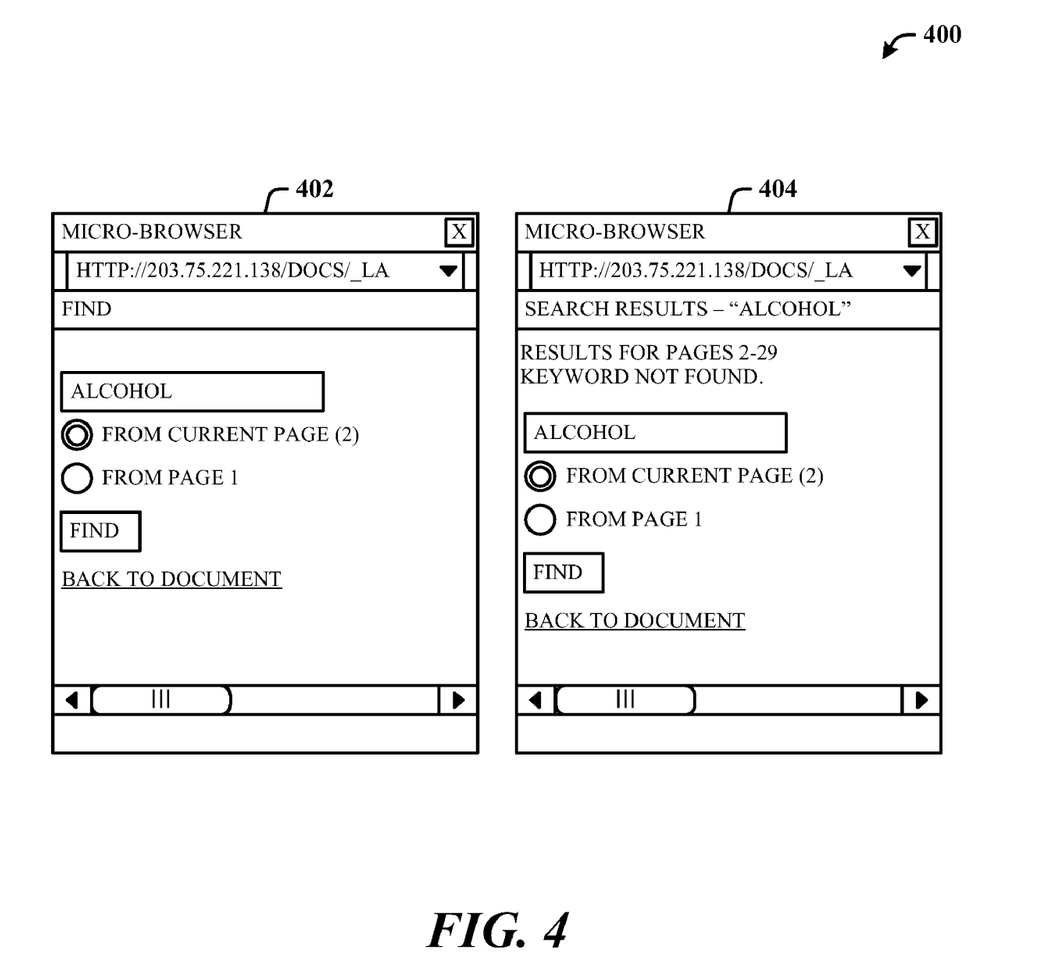
FIG. 4 illustrates a view where the search halts after no result is found for a predetermined number of document pages.

FIG. 4 illustrates a view 400 where the search halts after no result is found for a predetermined number of document pages. In a search initiation view 402 for the keyword "alcohol", the user selects the search to be performed beginning from the second page. In a results view 404, the user is notified that results were not found from pages 2-29. It can be that the document only had twenty-nine pages, and thus, this particular search is over or needs to be refined. It can also be the case that the search engine presents this as an interim notification in a document of ninety pages, for example, so that the user is not under the misconception that the search is defective, but ongoing. The engine can also pause the search at this time and then prompt the user to decide to continue the search, or terminate the search.

Figure 5:
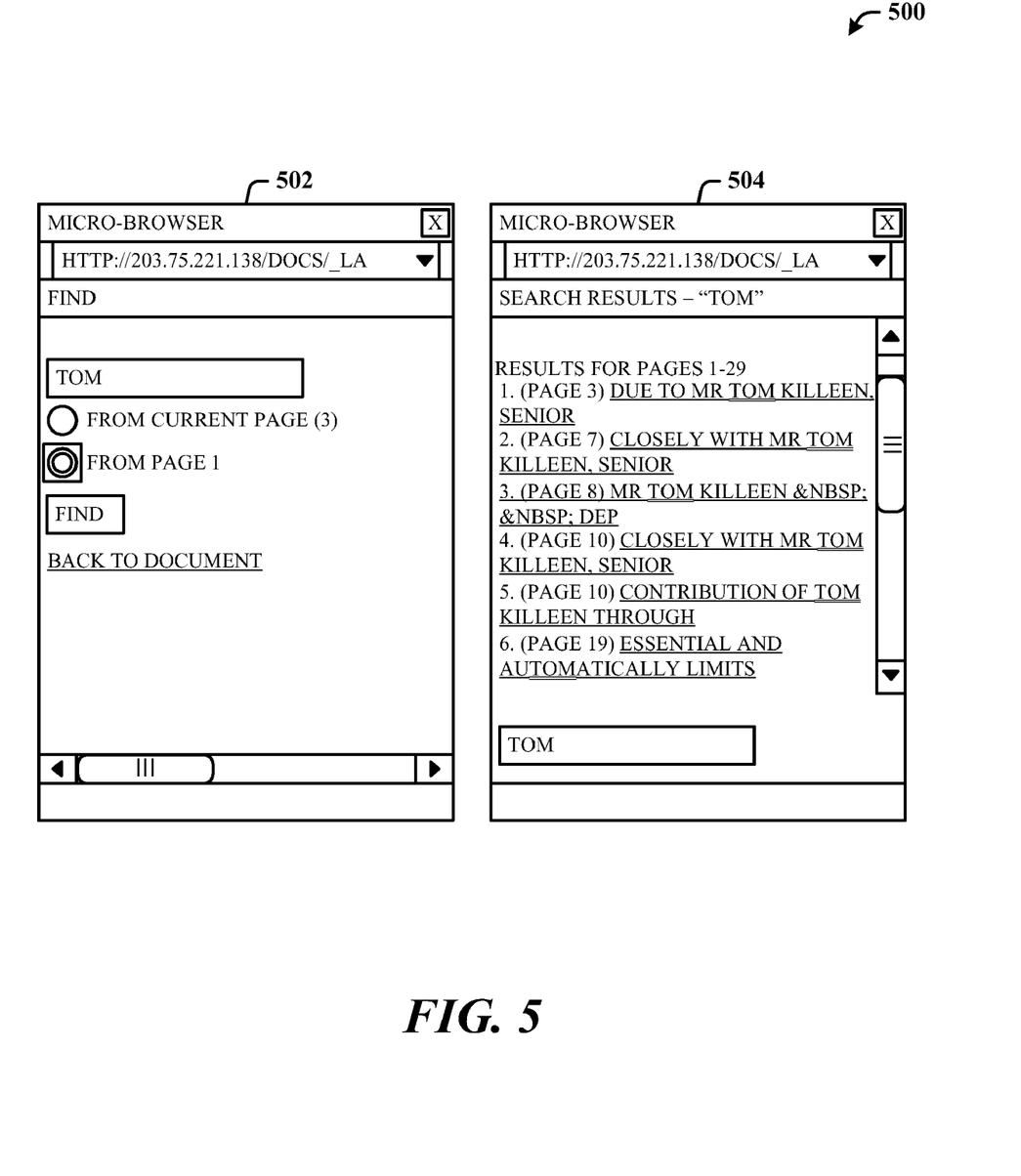
FIG. 5 illustrates an alternative embodiment of a view in which results can be displayed.

FIG. 5 illustrates an alternative embodiment of a view 500 in which results can be displayed. In a search initiation view 502, the search is conducted using a keyword "Tom" and beginning from the first page. After the search is performed, some or all of the results can be listed in a results view 504 with the keyword(s) (e.g., "TOM") highlighted. The textual context, in this case, is defined as the ten characters before and after the keyword. The page number of the page in which the keyword was found is also presented. Additionally, each result is a hyperlink that allows the user to navigate directly to the keyword located on the associated page. Note that keyword can be part of a larger word (e.g., automatically). This can be limited in the settings to only whole words, for example, if desired.

Note that in an alternative embodiment, multiple keywords can be searched with view results listed in various combinations of the keywords on pages, etc.

In order to accommodate legacy devices or non-search capable devices, a server-side rendering technology can be implemented to minimize device dependency (limitations). In this case, a client application is not employed on the handheld device (e.g., cell phone). When using cell phones to perform the searching, the cell phone can access the document(s) via 2G, 2.5G, 3G, etc., cellular networks. Note that the documents page search can be performed on documents provided on intranets, the Internet, and/or local to the device. In order to differentiate from standard browsers, the search engine server can include components that interrogate the browser information to determine that the browser is a micro-browser and that the view limitations are to be considered.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
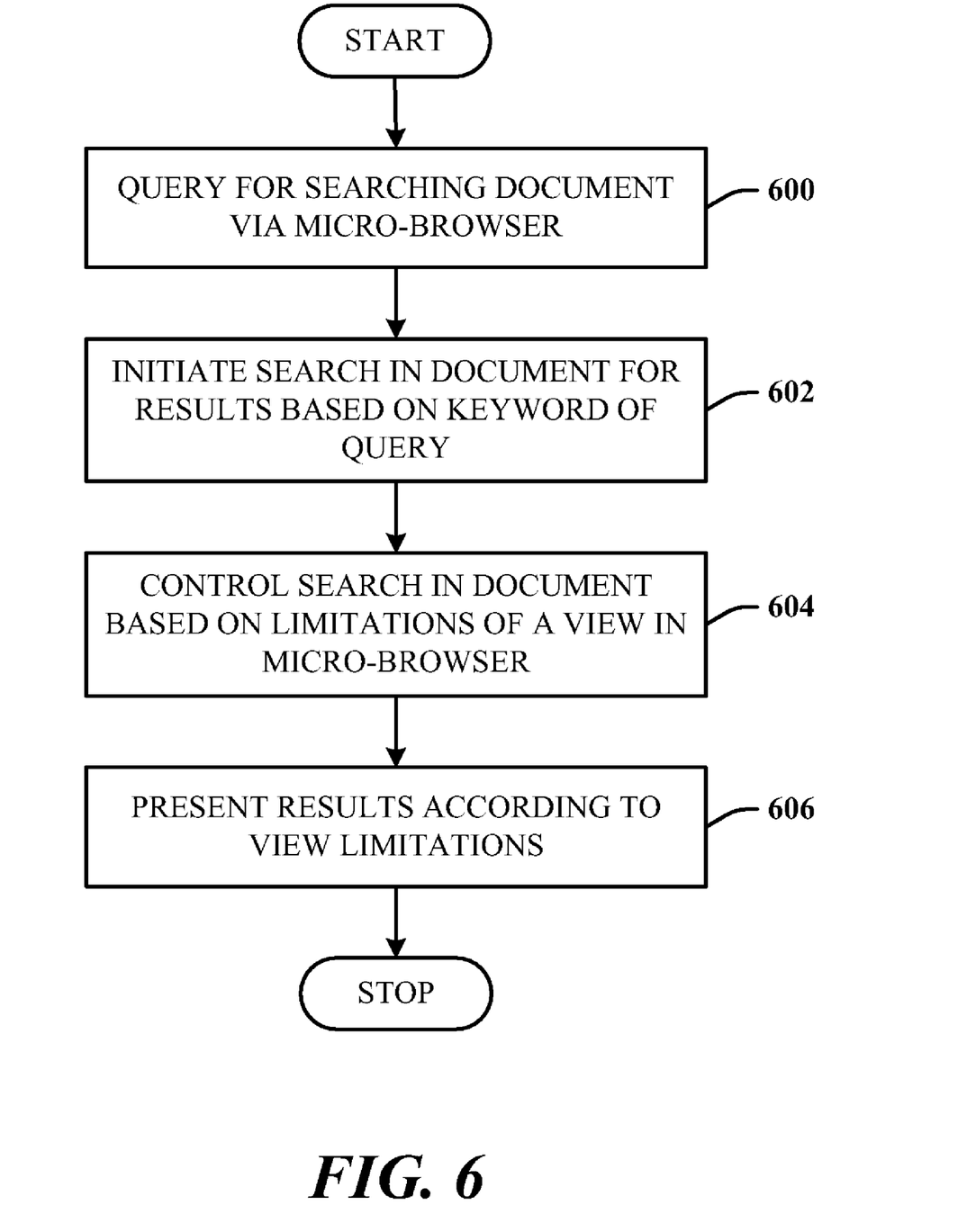
FIG. 6 illustrates a method of searching in a micro-browser.

FIG. 6 illustrates a method of searching in a micro-browser. At 600, a query is received for searching a document via a micro-browser. At 602, the search is initiated in the document for results based on a keyword of the query. At 604, the search in the document is controlled based on limitations of a view in the micro-browser. At 606, the results are presented according to the view limitations.

The view limitations are primarily related to viewing real estate. In other words, there is less viewing area in the smaller handheld device displays than in the larger personal computer displays. Thus, the way in which the search results are presented can be abbreviated to a certain point without reducing the effectiveness in the search tool on such small devices. Abbreviation can be provided by reducing the textual context of the keyword.

Figure 7:
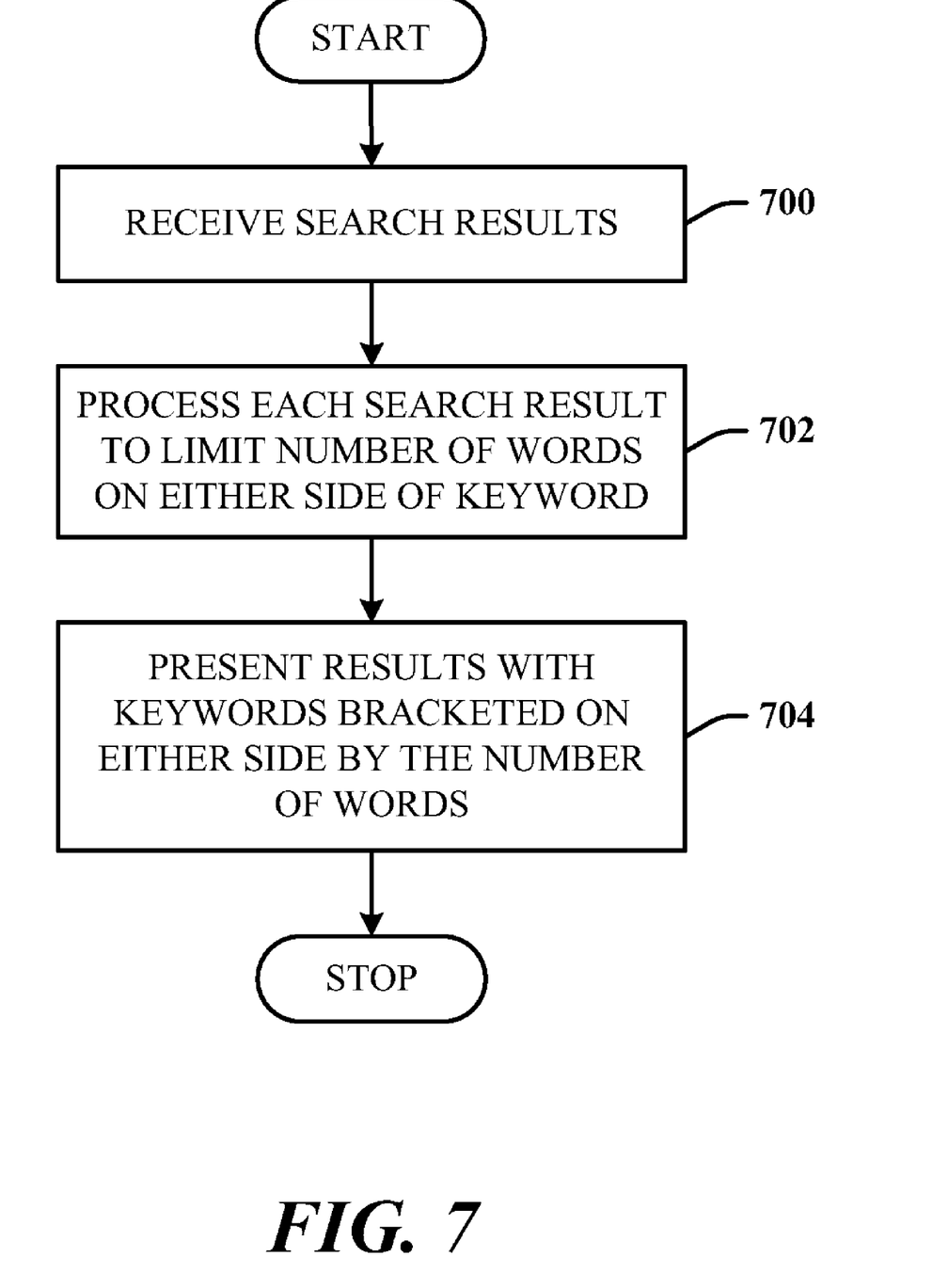
FIG. 7 illustrates a method of accommodating view limitations by abbreviating the textual context of a search result.

FIG. 7 illustrates a method of accommodating view limitations by abbreviating the textual context of a search result. At 700, search results are returned. At 702, each result is processed to limit the number of words on either side of the keyword. The limiting process can be performed according to a defined word count on either side of the keyword. Alternatively, the number of words can be automatically determined based on the view real estate. At 704, the results are presented with keywords bracketed on either side by the number of words. It is to be understood, however, that a keyword can be the leading word or trailing word of the word count. For example, if the word count in which to provide the results context is ten, the keyword can be the first word of the 10-word string, the last word in the 10-word string, or within the endpoints of the 10-word string, as previously described.

Figure 8:
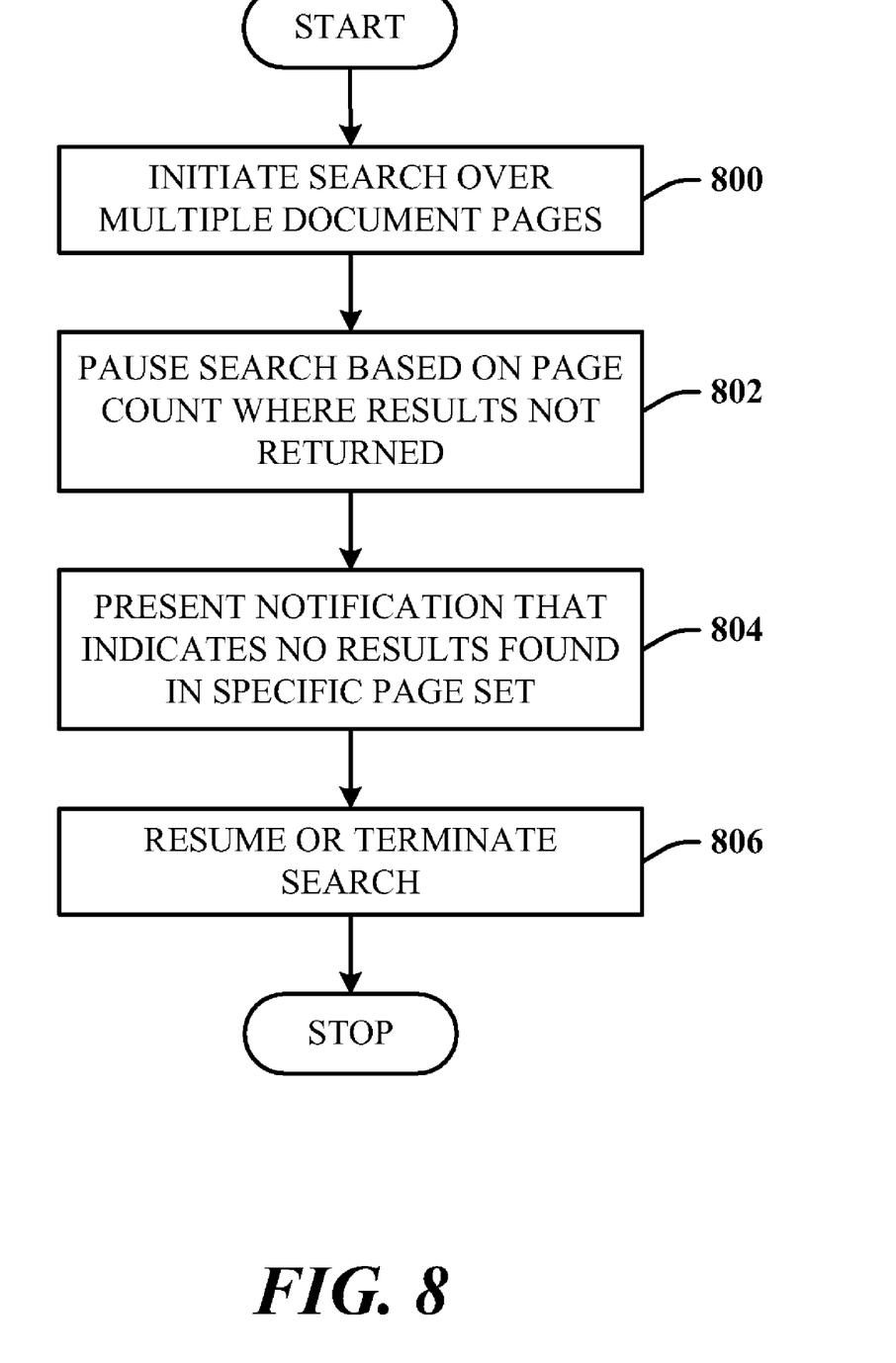
FIG. 8 illustrates a method of accommodating view limitations by sending a notification based on a number of pages searched without search results.

FIG. 8 illustrates a method of accommodating view limitations by sending a notification based on a number of pages searched without search results. At 800, a search is initiated over multiple document pages. At 802, the search is paused based on a page count where results are not obtained. At 804, a notification is presented that indicates no results have been found in a specific page set. At 806, the search can be resumed or terminated. For example, if the page set parameter is set to five, and no search results are returned in a consecutive group of five pages of a 100-page document, the user will receive notification of this so that the user does not incorrectly believe that the search may be faulty in some way.

Figure 9:
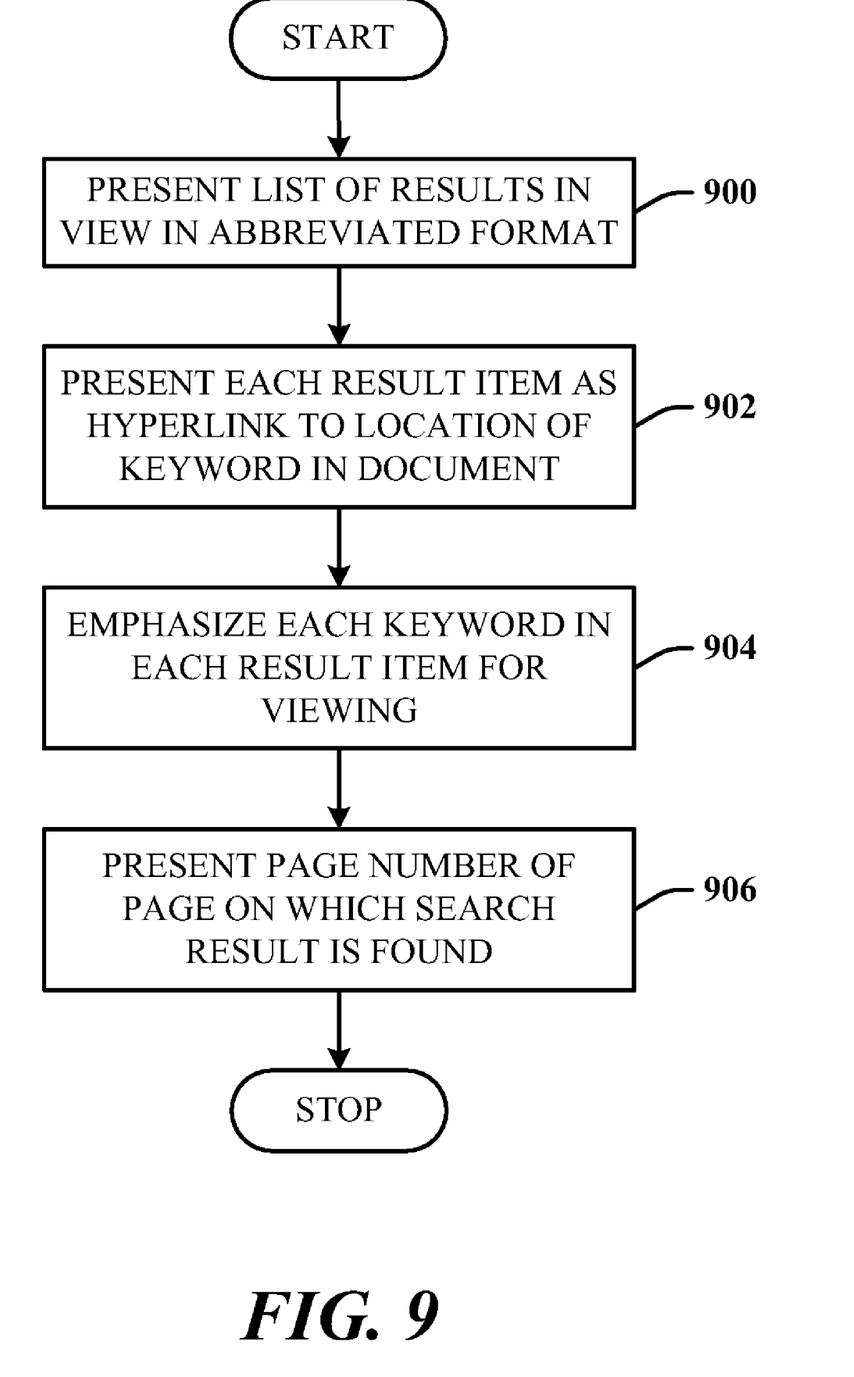
FIG. 9 illustrates a method of providing interactive navigation based on view limitations.

FIG. 9 illustrates a method of providing interactive navigation based on view limitations. At 900, a list of results is presented in the view in abbreviated format (e.g., short listing, small word context in which keyword resides, etc.). At 902, each result item is presented as a hyperlink to the location of the keyword in the document. At 904, each keyword in each result is emphasized for viewing. At 906, a page number of page on which a search result is found is presented.

Figure 10:
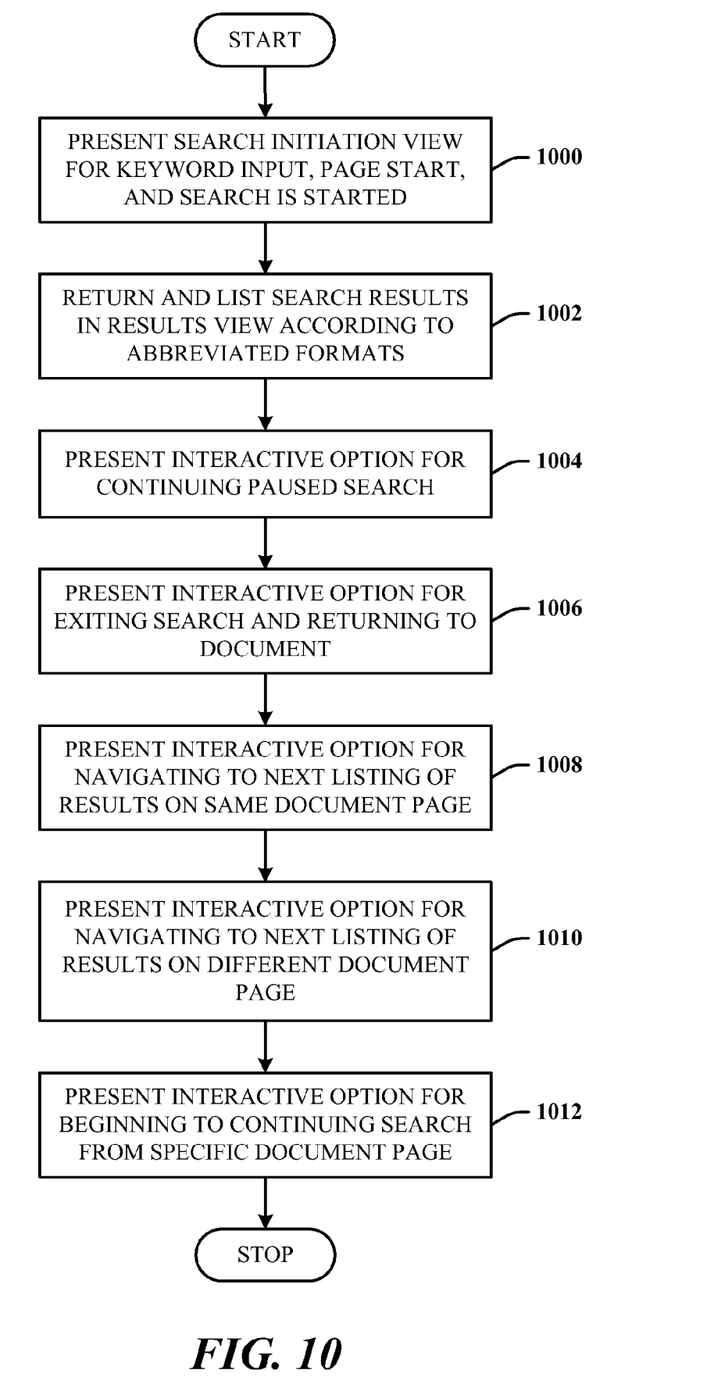
FIG. 10 illustrates a method of providing interactive navigation based on view limitations.

FIG. 10 illustrates a method of providing interactive navigation based on view limitations. At 1000, a search initiation view is presented for keyword input and page start, and the search is started. At 1002, search results are returned and listed in a results view according to abbreviated formats. At 1004, an interactive option is presented for continuing a paused search. At 1006, an interactive option is presented for exiting the search and returning to the document. At 1008, an interactive option is presented for navigating to a next listing of the results on a same page. At 1010, an interactive option is presented for navigating to a next listing of the results on a different document page. At 1012, an interactive option is presented for beginning or continuing the search from a specific document page.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
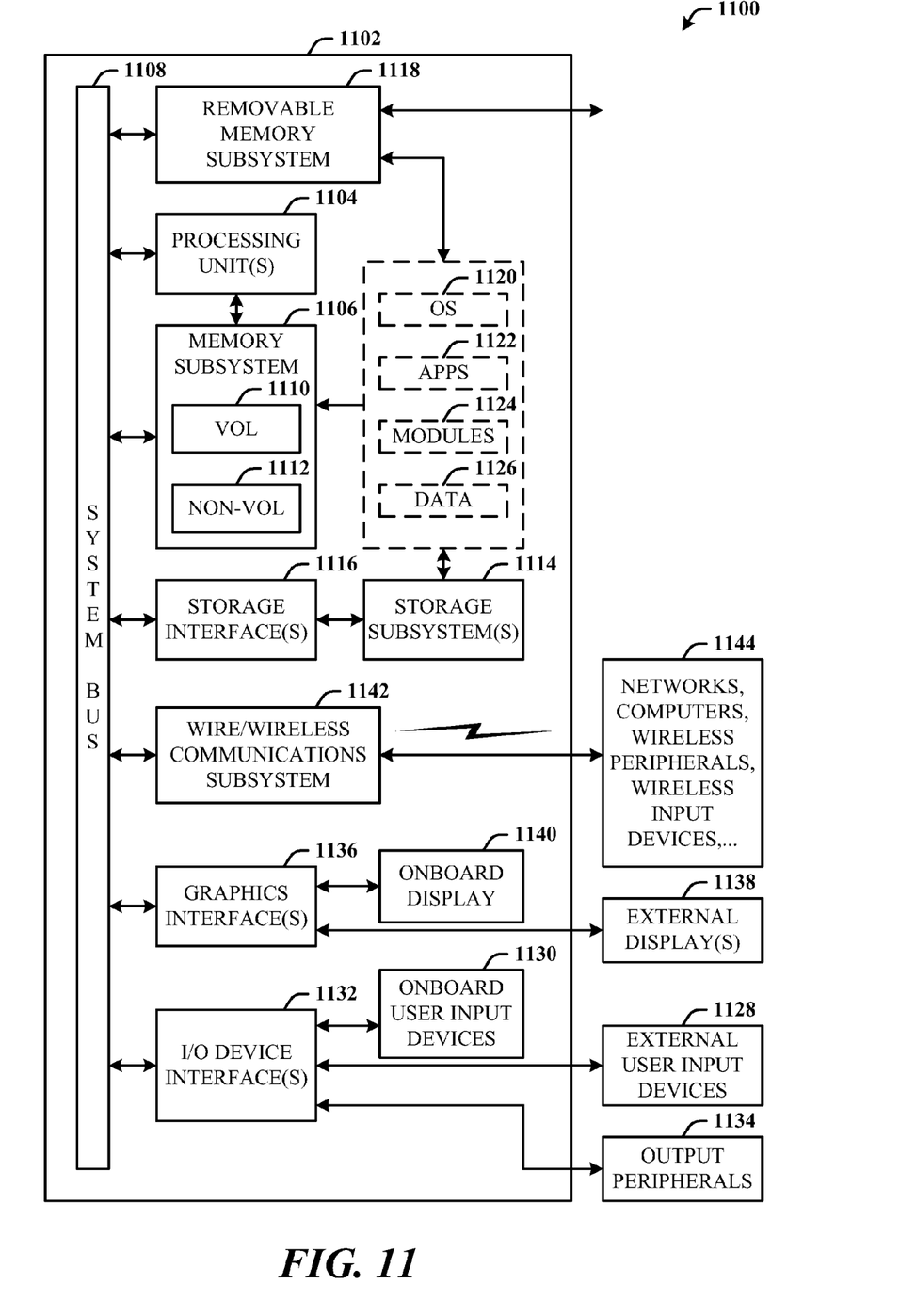
FIG. 11 illustrates a block diagram of a portable computing system operable to execute micro-browser search and view presentation in accordance with the disclosed architecture.

Referring now to FIG. 11, there is illustrated a block diagram of a portable computing system 1100 operable to execute micro-browser search and view presentation in accordance with the disclosed architecture. In order to provide additional context for various aspects thereof, FIG. 11 and the following discussion are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104, a system memory 1106, and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1106 can include volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the memory subsystem 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes storage subsystem(s) 1114 and storage interface(s) 1116 for interfacing the storage subsystem(s) 1114 to the system bus 1108 and other desired computer components. The storage subsystem(s) 1114 can include one or more of a hard disk drive (HDD), a magnetic floppy disk drive (FDD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a removable memory subsystem 1118 (e.g., flash drive form factor technology), and/or the storage subsystem(s) 1114, including an operating system 1120, one or more application programs 1122, other program modules 1124, and program data 1126.

Where the computer 1102 is of a handheld form factor with web-access, and/or with mobile capability for accessing documents via a cell phone carrier, the one or more application programs 1122, other program modules 1124, and program data 1126 can include the micro-browser 106, view 118, results 110, results information 200, page navigation 202, results navigation 204, views 300 of FIG. 3, views 400 of FIG. 4, and views 500 of FIG. 5, for example.

Where the computer 1102 is a server that includes a search engine for searching documents, the one or more application programs 1122, other program modules 1124, and program data 1126 can include the search component 102, results component 112, view component 116, document 108, results criteria 114 of FIG. 1, the results listing 306 in the results view 304 of FIG. 3, and one or more of the methods of FIGS. 6-10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Computer readable media can be any available media that can be accessed by the computer 1102 and includes volatile and non-volatile media, removable and non-removable media. For the computer 1102, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1102, programs, and data using external user input devices 1128 such as a keyboard and a mouse. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example. These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP) using logical connections via a wire/wireless communications subsystem 1142 to one or more networks and/or other computers. The other computers can include workstations, servers, routers, personal computers, microprocessor-based entertainment appliance, a peer device or other common network node, and typically include many or all of the elements described relative to the computer 1102. The logical connections can include wire/wireless connectivity to a local area network (LAN), a wide area network (WAN) hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wire/wireless communication subsystem 1142 (e.g., a network interface adapter, onboard transceiver subsystem, etc.) to communicate with wire/wireless networks, wire/wireless printers, wire/wireless input devices 1144, and so on. The computer 1102 can include a modem or has other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

Figure 12:
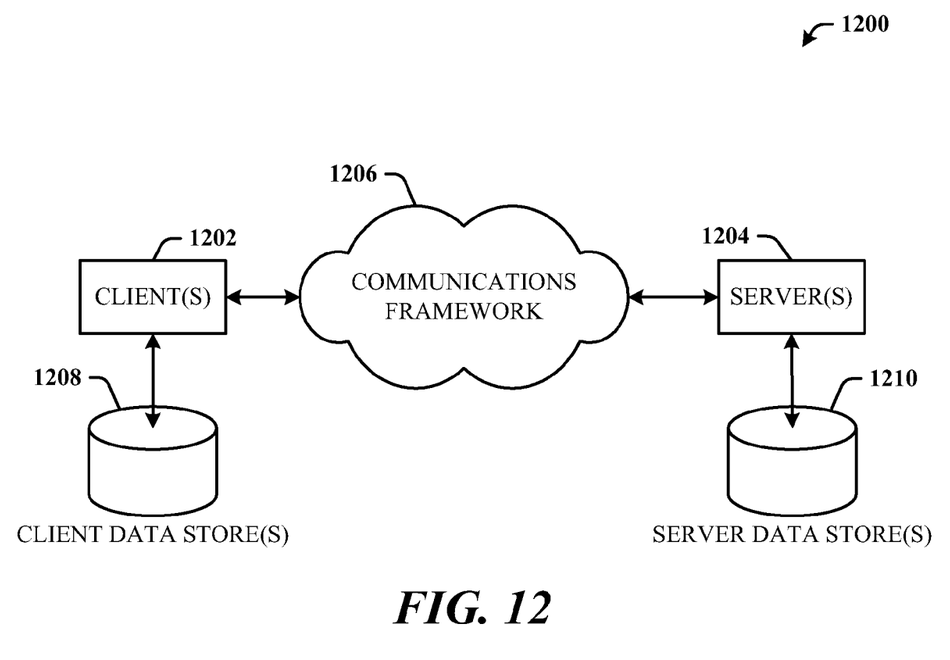
FIG. 12 illustrates a schematic block diagram of an environment that facilitates searching document pages using a micro-browser.

Referring now to FIG. 12, there is illustrated a schematic block diagram of an environment 1200 that facilitates searching document pages using a micro-browser. The environment 1200 includes one or more client(s) 1202. The client(s) 1202 can be hardware and/or software (e.g., threads, processes, computing devices). The client(s) 1202 can house cookie(s) and/or associated contextual information, for example.

The environment 1200 also includes one or more server(s) 1204. The server(s) 1204 can also be hardware and/or software (e.g., threads, processes, computing devices). The servers 1204 can house threads to perform transformations by employing the architecture, for example. One possible communication between a client 1202 and a server 1204 can be in the form of a data packet adapted to be transmitted between two or more computer processes. The data packet may include a cookie and/or associated contextual information, for example. The environment 1200 includes a communication framework 1206 (e.g., a global communication network such as the Internet) that can be employed to facilitate communications between the client(s) 1202 and the server(s) 1204.

Communications can be facilitated via a wire (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented search system, comprising:
a processing unit operatively coupled to one or more memory to provide:
a search component for receiving a query and an option via a micro-browser and initiating a search in a document for results based on a keyword of the query and the option to find occurrences of the keyword in the document in which the search is being performed, the option allowing specifying a page of the document to begin the search from and specifying a page of the document at which to end the search;
a results component for controlling the search in the document based on results criteria, the results component terminating the search when said specified page at which to end the search has been reached; and
a view component for presenting results information in a view via the micro-browser, the results information including occurrences of the keyword in the document.

2. The system of claim 1, wherein the results criteria includes a limit on a number of occurrences of the keyword returned and that can be presented as a list in the view.

3. The system of claim 1, wherein the results criteria includes a limit on a number of pages of the document searched before the keyword is found.

4. The system of claim 1, wherein the search is performed over pages of the document and the search is resumed from a page on which the search was paused.

5. The system of claim 1, wherein the search is performed over pages of the document and the search is restarted to a beginning of the document from a page on which the search was paused.

6. The system of claim 1, wherein the view component presents the results information in the view as including results with emphasis applied to the keyword and a location of the keyword in the document.

7. The system of claim 1, wherein the view component presents the results information in the view as including the results in a list and each result includes an active link that when selected navigates to a location of a respective page in the document, each result residing in the respective page in the document.

8. The system of claim 1, wherein the search component performs the search in at least one of a word processing document, spreadsheet document, or presentation document.

9. The system of claim 1, wherein the results information provides interactive control that allows at least one of a continuation of a paused search, exit of the search, restart of the paused search to a previous page of the document, and status of the search over a number of document pages.

10. A computer-implemented search system, comprising:
a processing unit operatively coupled to one or more memory to provide:
a search component for receiving a query and an option via a micro-browser of a handheld device and initiating a search in a document for results based on a keyword of the query and the option to find occurrences of the keyword in the document, the option allowing specifying a page of the document to begin the search from and specifying a page of the document at which to end the search when initiating the search, the document being one that is being viewed with the micro-browser and in which the search is being performed;
a results component for controlling the search based on results criteria, the results criteria including limit on a number of pages of the document searched without the keyword being found; and
a view component for presenting results information and a link back to the document in which the search is being performed in the view of the micro-browser, the results information including occurrences of the keyword in the document and a respective page number on which each occurrence of the keyword is found in the document.

11. The system of claim 10, wherein the view component presents one of the results as at least one of a list in the view with highlighting applied to the keyword and a location of the keyword in the document, and as a list in the view and each result includes an active link that when selected navigates to a location of a respective page in the document, each result residing in the respective page in the document.

12. The system of claim 10, wherein the results information includes a list of results in which the keyword in each result is emphasized in a partial textual context in which the keyword resides in the document.

13. The system of claim 10, wherein the result component terminates the search when said specified page at which to end the search has been reached.

14. A computer-implemented method of searching, comprising:
receiving a query and an option for searching a document via a micro-browser, the option allowing specifying a page of the document to begin a search from and specifying a page of the document at which to end the search;
initiating the search in the document for results based on a keyword of the query and the option to find occurrences of the keyword in the document in which the search is being performed;
automatically controlling the search in the document based on limitations of a view in the micro-browser; and
presenting the results according to view limitations, the view limitations comprising automatic determination of a plurality of words from the results for presentation based on a viewing area of the micro-browser.

15. The method of claim 14, further comprising limiting a number of the results that can be viewed to a listing that fits in the view and that includes an abbreviated textual context in which the keyword resides.

16. The method of claim 14, further comprising limiting a number of the results that can be viewed to a listing that fits in the view and that includes emphasis applied to the keyword and a hyperlink that automatically navigates to a location of the keyword in the document.

17. The method of claim 14, further comprising defining a number of pages in the document that will be searched without obtaining results before a notification is presented in the view as to a status of the search.

18. The method of claim 14, further comprising presenting interactive options in the view that allow for one or more of beginning the search from a specific page of the document, continuing a paused search, exiting the search and returning to the document, navigating to a next listing of the results on a same page, and navigating to a next listing of the results on a different page of the document.

19. The method of claim 14, wherein the search is performed in at least one of a word processing document, spreadsheet document, or presentation document.

20. The method of claim 14, further comprising defining a textual context in which the keyword is presented in the search results.

\* \* \* \* \*